UNITED STATES PATENT OFFICE 2,525,107

COATING COMPOSITION FOR METALS

Leo Robert Whiting and Philip Frederic Wangner, Jr., Bloomfield, N. J., assignors to the United States of America as represented by the Secretary of the Navy No Drawing. Application October 24, 1945, Serial No. 624,336

5 Claims. (Cl. 148—6.16)

This invention relates to a coating composition for metals. Further, it relates to a corrosion inhibiting coating for metals, such as steel, galvanized iron and aluminum. In particular, it relates to a corrosion inhibiting coating which will serve as a base coat for paint.

The chemical treatment of metal surfaces to render them resistant to corrosion and provide a type of surface to which protective paint coatings will adhere, has received much attention in the prior art. Phosphoric acid in aqueous or alcoholic solution has long been used for this purpose, to react with the metal surface and deposit a tightly adhering and insoluble layer of metal phosphate. However, the results obtainable from such treatments leave much to be desired. Deposits are usually not uniform and continuous unless the operation is performed under carefully controlled conditions of temperature, time and concentration of reaction. The deposits formed have value if the surface is quickly protected by painting with a good paint. Without such additional protection they do not withstand exposure to weather or moist atmosphere for any extended period of time. For these reasons, prior art treatments involving phosphoric acid are useful principally for factory finishing of metal products, but have not been so satisfactory for field operations on steel structures such as ships, bridges, buildings, etc.

Having these defects in view, it is therefore an object of the present invention to provide a corrosion inhibiting coating for metals, such as steel, galvanized iron and aluminum.

It is also an object of this invention to provide a corrosion inhibiting coating for metals such as steel, galvanized iron and aluminum which is continuous, and which adheres firmly to the metal surface.

In particular, it is an object of this invention to provide a corrosion inhibiting coating for metals such as steel, galvanized iron and aluminum which is continuous, firmly attached to the metal surface and which serves as a ground or base coat for painting.

The present invention based on the discovery that phosphoric acid in combination with a resinous material containing active hydroxyl groups such as polyvinyl butyral and dissolved in suitable organic solvents, when applied to steel, zinc, aluminum or other metals, yields a deposit which has greatly improved protective value as compared to the previously known phosphoric acid containing treatments. The resulting film is more uniform and continuous, characterized by fine and uniform crystal structure of the metal phosphate formed and the resinous material bonds the entire film structure in such a manner as to yield an adherent, cohesive coating. This coating, even though extremely thin, provides good protection against corrosion for much longer periods of time than similar coatings containing no resinous binder or those containing binders of other known types. The film also provides an excellent base for the adhesion of subsequent paint coats, and thus adds materially to the ultimate protection value of the entire paint system. These improvements have been particularly apparent in the protection of steel and galvanized surfaces of ships and other structures immersed in sea water, where corrosion conditions are unusually severe and troublesome. For instance, galvanized steel treated in accordance with this invention before painting has remained in excellent condition for one year or longer, whereas galvanized steel untreated or treated with phosphoric acid alone before painting, fails badly in one to three months due to blistering or peeling of the paint system.

The following examples are illustrative of the compositions which have proved most effective for protecting steel, zinc, and aluminum surfaces:

Example 1

| | Parts by weight |
|---|---|
| Phosphoric acid (85%) | 2.0 |
| Polyvinyl butyral resin | 5.0 |
| Denatured alcohol | 95.0 |
| Total | 102.0 |

The above composition applied to clean steel by brushing, dipping or spraying, and allowed to dry one hour at room temperature, yields good protection against moist salt air at least four times as long as a similar composition without the polyvinyl butyral resin. A similar ratio of improvement has been noted for steel treated as above, painted with high quality marine paint and immersed 12 to 18 months in the sea.

Example 2

| | Parts by weight |
|---|---|
| Phosphoric acid (85%) | 2.24 |
| Polyvinyl butyral resin | 8.96 |
| Zinc tetroxy chromate | 8.54 |
| Silica | 1.42 |
| Carbon black | .08 |
| Butanol | 81.00 |
| Total | 102.24 |

The inclusion of pigments in the phosphoric acid-polyvinyl butyral composition has in most cases yielded better performance than the clear composition of Example 1. Zinc tetroxy chromate, possibly due to the additional corrosion inhibiting properties of the chromate content, yields better results than other known pigments.

Example 3

The composition of Example 2 was applied in a thin wash coat to steel, galvanized and aluminum surfaces, followed by a four mil thickness of the same composition without phosphoric acid, dried at room temperature and immersed in sea water 150 days without any visible signs of blistering or corrosion. Similar surfaces prepared without the phosphoric butyral wash coat blistered and failed badly on the galvanized surface in 20 days or were inferior also on steel and aluminum surfaces.

While the above description has been limited basically to a corrosion inhibiting coating composition comprising a solution of phosphoric acid and polyvinyl butyral resin, it is not desired to strictly limit it thereto beyond the extent as defined by the herewith appended claims since any active hydroxyl group containing resin in solution with phosphoric acid will produce corrosion inhibiting coating.

What is claimed is:

1. A coating composition characterized by the ability to inhibit the corrosion of metals such as steel, galvanized iron and aluminum and to serve as a ground coat for painting thereof, comprising a solution of phosphoric acid, polyvinyl butyral resin, zinc tetroxy chromate, silica and carbon black, the solvent being butanol.

2. A coating composition characterized by the ability to inhibit the corrosion of metals such as steel, galvanized iron and aluminum consisting of,

| | Parts by weight |
|---|---|
| Phosphoric acid (85%) | 2.24 |
| Polyvinyl butyral resin | 8.96 |
| Zinc tetroxy chromate | 8.54 |
| Silica | 1.42 |
| Carbon black | .08 |
| Butanol | 81.00 |
| Total | 102.24 |

3. A composite metal-adherent coating characterized by the ability to inhibit the corrosion of metals such as steel comprising a thin wash coat of the composition as defined by claim 2 applied to a metal base and dried thereon at room temperatures and a superimposed coat of the same composition minus the phosphoric acid.

4. A coating composition characterized by the ability to inhibit the corrosion of metals and to serve as a ground coat for painting thereof, comprising a solution of phosphoric acid, a polyvinyl butyral resin, a zinc tetroxy chromate pigment and a butanol solvent.

5. A composite coating characterized by the ability to inhibit the corrosion of metals such as steel, comprising a thin wash coat of the composition as defined by claim 2 applied to a metal base and dried thereon at room temperatures.

LEO ROBERT WHITING.
PHILIP FREDERIC WANGNER, Jr.

REFERENCES CITED

The following references are of record in the file of this patent:

UNITED STATES PATENTS

| Number | Name | Date |
|---|---|---|
| 2,060,572 | Heck | Nov. 10, 1936 |
| 2,158,111 | Doolittle | May 16, 1939 |
| 2,160,061 | Doolittle | May 30, 1939 |
| 2,249,514 | Berg | July 15, 1941 |
| 2,260,819 | Balassa | Oct. 28, 1941 |
| 2,286,964 | Hucks | June 16, 1942 |
| 2,302,557 | Langkammer | Nov. 17, 1942 |
| 2,403,077 | Hershberger | July 2, 1946 |
| 2,487,223 | Cupery | Nov. 8, 1949 |

FOREIGN PATENTS

| Number | Country | Date |
|---|---|---|
| 179,811 | Great Britain | May 18, 1922 |